United States Patent
Tran (10) Patent No.: US 12,147,812 B2
(45) Date of Patent: Nov. 19, 2024

(54) OUT-OF-ORDER EXECUTION OF LOOP INSTRUCTIONS IN A MICROPROCESSOR (71) Applicant: Simplex Micro, Inc., San Jose, CA (US)

(72) Inventor: Thang Minh Tran, Tustin, CA (US)

(*) Notice: Subject to any disclaimer, the term of this patent is extended or adjusted under 35 U.S.C. 154(b) by 92 days.

(21) Appl. No.: 18/141,465

(22) Filed: Apr. 30, 2023

(65) Prior Publication Data

US 2024/0020127 A1 Jan. 18, 2024

Related U.S. Application Data (60) Provisional application No. 63/368,282, filed on Jul. 13, 2022.

(51) Int. Cl.
*G06F 9/38* (2018.01)
*G06F 9/30* (2018.01)

(52) U.S. Cl.
CPC ........ *G06F 9/3842* (2013.01); *G06F 9/30101* (2013.01)

(58) Field of Classification Search
CPC ... G06F 9/30101; G06F 9/3842; G06F 9/3836
See application file for complete search history.

(56) References Cited

U.S. PATENT DOCUMENTS

| | | |
|---|---|---|
| 5,021,985 A | 6/1991 | Hu et al. |
| 5,185,868 A | 2/1993 | Tran |
| 5,251,306 A | 10/1993 | Tran |
| 5,655,096 A | 8/1997 | Branigin |
| 5,699,536 A | 12/1997 | Hopkins et al. |
| 5,799,163 A | 8/1998 | Park et al. |
| 5,802,386 A | 9/1998 | Kahle et al. |
| 5,809,268 A | 9/1998 | Chan |
| 5,835,745 A | 11/1998 | Sager et al. |
| 5,860,018 A | 1/1999 | Panwar |
| 5,881,302 A | 3/1999 | Omata |
| 5,903,919 A | 5/1999 | Myers |
| 5,958,041 A | 9/1999 | Petolino, Jr. et al. |
| 5,961,630 A | 10/1999 | Zaidi et al. |
| 5,964,867 A | 10/1999 | Anderson et al. |

(Continued)

FOREIGN PATENT DOCUMENTS

| | | |
|---|---|---|
| EP | 0840213 A2 | 5/1998 |
| EP | 0902360 A2 | 3/1999 |

(Continued)

OTHER PUBLICATIONS

Anonymous: "RISC-V—Wikipedia", Apr. 16, 2022 (Apr. 16, 2022), XP093142703, Retrieved from the Internet:URL:https://en.wikipedia.org/w/index.php?title=RISC-V&oldid=1083030760 [retrieved on Mar. 27, 2024].

(Continued)

*Primary Examiner* — Zachary K Huson
(74) *Attorney, Agent, or Firm* — Appleton Luff (57) ABSTRACT

A processor includes a loop detection unit to detect an OOO-loop based on the reserved resources for execution of the OOO loop. The processor executes the OOO loop by reading source operand data on first iteration of the loop and write back data on the last iteration of the loop while allowing instructions after the loop to be concurrently executed.

28 Claims, 7 Drawing Sheets

(56) References Cited

U.S. PATENT DOCUMENTS

| | | | |
|---|---|---|---|
| 5,996,061 | A | 11/1999 | Lopez-Aguado et al. |
| 5,996,064 | A | 11/1999 | Zaidi et al. |
| 6,016,540 | A | 1/2000 | Zaidi et al. |
| 6,035,393 | A | 3/2000 | Glew et al. |
| 6,065,105 | A | 5/2000 | Zaidi et al. |
| 6,247,113 | B1 | 6/2001 | Jaggar |
| 6,282,634 | B1 | 8/2001 | Hinds et al. |
| 6,304,955 | B1 | 10/2001 | Arora |
| 6,425,090 | B1 | 7/2002 | Arimilli et al. |
| 6,453,424 | B1 | 9/2002 | Janniello |
| 7,069,425 | B1 | 6/2006 | Takahashi |
| 7,434,032 | B1 | 10/2008 | Coon et al. |
| 8,166,281 | B2 | 4/2012 | Gschwind et al. |
| 9,256,428 | B2 | 2/2016 | Heil et al. |
| 10,339,095 | B2 | 7/2019 | Moudgill et al. |
| 11,062,200 | B2 | 7/2021 | Lie et al. |
| 11,132,199 | B1 | 9/2021 | Tran |
| 11,144,319 | B1 | 10/2021 | Battle et al. |
| 11,163,582 | B1 | 11/2021 | Tran |
| 11,204,770 | B2 | 12/2021 | Tran |
| 11,263,013 | B2 | 3/2022 | Tran |
| 11,467,841 | B1 | 10/2022 | Tran |
| 11,829,187 | B2 | 11/2023 | Tran |
| 11,954,491 | B2 | 4/2024 | Tran |
| 12,061,906 | B2 | 8/2024 | Stephens et al. |
| 2001/0004755 | A1 | 11/2001 | Levy et al. |
| 2003/0023646 | A1 | 1/2003 | Lin et al. |
| 2003/0135712 | A1 | 7/2003 | Theis |
| 2004/0073779 | A1 | 4/2004 | Hokenek et al. |
| 2005/0251657 | A1* | 11/2005 | Boucher .............. G06F 9/3004 712/E9.032 |
| 2006/0010305 | A1 | 1/2006 | Maeda et al. |
| 2006/0095732 | A1 | 5/2006 | Tran et al. |
| 2006/0218124 | A1 | 9/2006 | Williamson et al. |
| 2006/0259800 | A1 | 11/2006 | Maejima |
| 2006/0288194 | A1 | 12/2006 | Lewis et al. |
| 2007/0038984 | A1 | 2/2007 | Gschwind et al. |
| 2007/0260856 | A1 | 11/2007 | Tran et al. |
| 2011/0099354 | A1 | 4/2011 | Takashima et al. |
| 2011/0320765 | A1 | 12/2011 | Karkhanis et al. |
| 2012/0047352 | A1 | 2/2012 | Yamana |
| 2013/0151816 | A1 | 6/2013 | Indukuru et al. |
| 2013/0297912 | A1 | 11/2013 | Tran et al. |
| 2013/0346985 | A1 | 12/2013 | Nightingale |
| 2014/0059328 | A1* | 2/2014 | Gonion ................. G06F 9/3842 712/222 |
| 2014/0082626 | A1 | 3/2014 | Busaba et al. |
| 2015/0026435 | A1 | 1/2015 | Muff et al. |
| 2015/0212972 | A1 | 7/2015 | Boettcher et al. |
| 2015/0227369 | A1 | 8/2015 | Gonion |
| 2016/0092238 | A1 | 3/2016 | Codrescu et al. |
| 2016/0275043 | A1 | 9/2016 | Grochowski et al. |
| 2016/0371091 | A1 | 12/2016 | Brownscheidle et al. |
| 2017/0177354 | A1 | 6/2017 | Ould-Ahmed-Vall |
| 2017/0357513 | A1 | 12/2017 | Ayub et al. |
| 2018/0181400 | A1* | 6/2018 | Scherbinin .............. G06F 9/325 |
| 2018/0196678 | A1 | 7/2018 | Thompto |
| 2018/0253310 | A1* | 9/2018 | Stephens .............. G06F 9/30043 |
| 2019/0079764 | A1 | 3/2019 | Diamond et al. |
| 2019/0243646 | A1 | 8/2019 | Anderson |
| 2020/0004534 | A1 | 1/2020 | Gurram et al. |
| 2020/0004543 | A1 | 1/2020 | Kumar et al. |
| 2020/0319885 | A1 | 10/2020 | Eyole et al. |
| 2020/0387382 | A1 | 12/2020 | Tseng et al. |
| 2021/0026639 | A1 | 1/2021 | Tekmen et al. |
| 2021/0311743 | A1 | 10/2021 | Tran |
| 2021/0326141 | A1 | 10/2021 | Tran |
| 2021/0389979 | A1* | 12/2021 | Tran ..................... G06F 9/3836 |
| 2023/0068637 | A1 | 3/2023 | Feiste et al. |
| 2023/0244490 | A1 | 8/2023 | Tran |
| 2023/0244491 | A1 | 8/2023 | Tran |

FOREIGN PATENT DOCUMENTS

| | | |
|---|---|---|
| EP | 0959575 A1 | 11/1999 |
| WO | 0010076 A1 | 2/2000 |
| WO | 0208894 A1 | 1/2002 |
| WO | 0213005 A1 | 2/2002 |

OTHER PUBLICATIONS

PCT/US2023/018970, International Preliminary Report on Patentability, Jul. 18, 2024.

PCT/US2023/018996, International Preliminary Report on Patentability, Jul. 18, 2024.

PCT/US2023/018996, Written Opinion of the International Preliminary Examining Authority, Apr. 8, 2024.

PCT/US2023/027497; 20/13/2023, Written Opinion of the International Searching Authority.

PCTUS2023081682, Written Opinion of the International Searching Authority, Mar. 22, 2024.

Written Opinion of The International Preliminary Examining Authority, PCTUS2023/018970, Mar. 25, 2024.

Choi, W., Park, SJ., Dubois, M. (2009). Accurate Instruction Pre-scheduling in Dynamically Scheduled Processors. In: Stenström, P. (eds) Transactions on High-Performance Embedded Architectures and Compilers I. Lecture Notes in Computer Science, vol. 5470 Springer, Berlin, Heidelberg. pp. 107-127. (Year: 2009).

Diavastos, Andreas & Carlson, Trevor. (2021). Efficient Instruction Scheduling using Real-time Load Delay Tracking. (Year: 2021).

J. S. Hu, N. Vijaykrishnan and M. J. Irwin, "Exploring Wakeup-Free Instruction Scheduling," 10th International Symposium on High Performance Computer Architecture (HPCA'04), Madrid, Spain, pp. 232-232 (Year: 2004).

Written Opinion of the International Searching Authority, PCT/S2022/052185.

Written Opinion of the International Searching Authority, PCT/US2023/018970.

Written Opinion of the International Searching Authority, PCT/US2023/018996.

* cited by examiner

FIG. 1

```
Loop:   lw     x12, 0(x9)        # load data into x12=A[j]
        addi   x9,x9,4           # Address increment
        add    x10,x10,x12       # Accumulate data to x10
        addi   x11,x11,1         # Increment iteration count
        blt    x11,x13,Loop      # Jump back to start of loop
Next:
```

FIG. 2A

```
Loop:   lw     x12, 0(x9)        # load data into x12=A[j]   ⎫
        addi   x9,x9,4           # Address increment         ⎬ Load data loop
        addi   x11,x11,1         # Fake increment iteration count
        blt    x11,x13,Loop      # Fake jump back to start of loop ⎭
Loop1:  add    x10,x10,x12       # Accumulate data to x10    ⎫
        addi   x11,x11,1         # Increment iteration count ⎬ Data processing loop
        blt    x11,x13,Loop1     # Jump back to start of loop1 ⎭
Next:
```

Read Control

| Time | Valid | Reg | Loop |
|---|---|---|---|
| 63 | 0 | x0 | 0 |
| 62 | 0 | x0 | 0 |
| . | 0 | x27 | 0 |
| 28 | 1 | x12 | 1 |
| 27 | 1 | x7 | 0 |
| 26 | 1 | x27 | 0 |
| 25 ← time count | 1 | x5 | 0 |
| 24 | 0 | x8 | 0 |
| . | 0 | x23 | 0 |
| 1 | 0 | x22 | 0 |
| 0 | 0 | x29 | 0 |

FIG. 6A

Write Control

| Time | Valid | Reg | Loop |
|---|---|---|---|
| 63 | 0 | x0 | 0 |
| 62 | 0 | x0 | 0 |
| . | 0 | x25 | 0 |
| 28 | 1 | x14 | 1 |
| 27 | 1 | x22 | 0 |
| 26 | 1 | x9 | 0 |
| 25 ← time count | 1 | x5 | 0 |
| 24 | 0 | x3 | 0 |
| . | 0 | x6 | 0 |
| 1 | 0 | x8 | 0 |
| 0 | 0 | x22 | 0 |

OUT-OF-ORDER EXECUTION OF LOOP INSTRUCTIONS IN A MICROPROCESSOR

RELATED APPLICATIONS

This application claims priority to U.S. provisional patent application Ser. No. 63/368,282, filed Jul. 13, 2022, and entitled "Out-Of-Order Execution Of Loop Instructions in a Microprocessor," which application is hereby incorporated by reference in its entirety.

This application is related to the following U.S. patent application which is hereby incorporated by reference in its entirety: U.S. patent application Ser. No. 17/588,315, filed Jan. 30, 2022, and entitled "Microprocessor with Time Counter for Statically Dispatching Instructions."

BACKGROUND

Technical Field

The present invention relates to the field of computer processors. More particularly, it relates to issuing and executing out-of-order loop instructions in a processor where the processor may be a general-purpose microprocessor, a digital-signal processor, a single instruction multiple data processor, a vector processor, a graphics processor, or other type of processor which executes instructions.

Technical Background

Processors have become increasingly complex, chasing small increments in performance at the expense of power consumption and semiconductor chip area. The approach in out-of-order (OOO) superscalar microprocessors has remained basically the same for the last 25-30 years, with excessive power dissipation arising from dynamic scheduling of instructions for execution from reservation stations or central windows. Designing an OOO superscalar microprocessor has consequently become a huge undertaking. Hundreds of instructions are issued to the execution pipeline where data dependencies are resolved and arbitrated for execution by a large number of functional units. The result data from the functional units are again arbitrated for the write buses to write back to the register file. If the data cannot be written back to the register file, then the result data are kept in temporary registers and a complicated stalling procedure is performed for the execution pipeline.

Execution of loops is important in many applications where the number of iterations can be in the hundreds or thousands. In dynamic scheduling, it is difficult to track a loop in the execution pipeline. The loop may contain load instructions with load data coming from external memory causing the microprocessor to stall, thereby degrading performance. The load data from external memory often result from a data cache miss or non-cacheable load data. Another impact on performance is that the latency of fetching external data is greater than the limitation on the number of external memory requests when pipelining of external memory requests is not possible.

Thus, there is a need for an OOO superscalar microprocessor which efficiently executes loops, consumes less power, has a simpler design, and is scalable with consistently high performance.

SUMMARY

The disclosed embodiments provide a processor with a time counter and a method for statically dispatching instructions to an execution pipeline with preset execution times based on a time count from the counter.

An approach to microprocessor design employs static scheduling of instructions. A disclosed static scheduling algorithm is based on the assumption that a new instruction has a perfect view of all previous instructions in the execution pipeline, and thus it can be scheduled for execution at an exact time in the future, e.g., with reference to a time count from a counter. Assuming an instruction has 2 source operands and 1 destination operand, the instruction can be executed out-of-order when conditions are met of (1) no data dependency, (2) availability of read buses to read data from the register file, (3) availability of a functional unit to execute the instruction, and (4) availability of a write bus to write result data back to the register file.

All the above requirements are associated with time: (1) a time when all data dependencies are resolved, (2) at which time the read buses are available to read source operands from a register file, (3) at which subsequent time the functional unit is available to execute the instruction, and (4) at which further subsequent time the write bus is available to write result data back to the register file.

In one embodiment a time counter increments every clock cycle and the resulting count is used to statically schedule instruction execution. Instructions have known throughput and latency times, and thus can be scheduled for execution based on the time count. For example, a multiply instruction with throughput time of 1 and latency time of 3 can be scheduled to execute when the data dependency is resolved. If the time count is 5 and the multiply has no data dependency at time 8, then the available read buses are scheduled to read data from the register file at time 8, the available multiply unit is scheduled to execute the multiply instruction at time 9, and the available write bus is scheduled to write result data from multiply unit to the register file at time 11. The multiply instruction is dispatched to the multiply execution queue with the preset execution times. The read buses, the multiply unit, and the write bus are scheduled to be busy at the preset times. The maximum time count is designed to accommodate the largest future time to schedule execution of instruction. In some embodiments, the time count is 64 and no instruction can be scheduled to execute more than 64 cycles in the future. In another embodiment a superscalar microprocessor with quad-issue can have 256 instructions in the execution pipeline. With static scheduling of instructions based on the time count, the complexity of dynamic scheduling is eliminated, the arbitration of resources is reduced, and the hundreds of comparators for data dependency are eliminated. The basic out-of-order execution of instructions operates similarly to that of a conventional out-of-order processor, but statically scheduling of instructions with a time count is more efficient. The elimination of the extra components means the processor consumes less power. Instructions are efficiently executed out-of-order with preset times to retain the performance compared to traditional dynamic approaches. The number of issued instructions is scalable from scalar to superscalar.

A basic block is defined herein as a code sequence with no branches in except to the entry, and no branches out except at the exit. A loop is defined as a basic block where the branch target address of the exit point is the same as the entry address of the same basic block. A loop may be detected as an out-of-order execution loop when the loop iterations can be executed out-of-order. Certain types of loops can be detected for out-of-order execution, for example, accumulation of load data, counting of matching data, or copying of memory data in which ordering of the data is not required. For accumulation loops, a load instruction can fetch data out-of-order as long as all data are accumulated. In one embodiment, processor resources are reserved for out-of-order loop execution and a subsequent instruction after the loop, that can be concurrently executed. In another embodiment, a data processing loop is stalled in the instruction issue unit to wait for load data. For execution, a loop is broken into 2 smaller loops, one to load data, and one to process data. In one embodiment, a load data loop fetches data out-of-order and sends load data to the data processing loop.

BRIEF DESCRIPTION OF THE DRAWINGS

Aspects of the present invention are best understood from the following description when read with the accompanying figures.

DETAILED DESCRIPTION

The following description provides different embodiments for implementing aspects of the present invention. Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

In one embodiment a processor is provided, typically implemented as a microprocessor, that schedules instructions to be executed at a preset time based on a time count from a time counter. In such a processor the instructions are scheduled to be executed using the known throughput and latency of each instruction to be executed. For example, in one embodiment, the ALU instructions have throughput and latency times of 1, the multiply instructions have throughput time of 1 and the latency time of 2, the load instructions have the throughput time of 1 and latency time of 3 (based on a data cache hit), and the divide instruction have throughput and latency times of 32.

Figure 1:
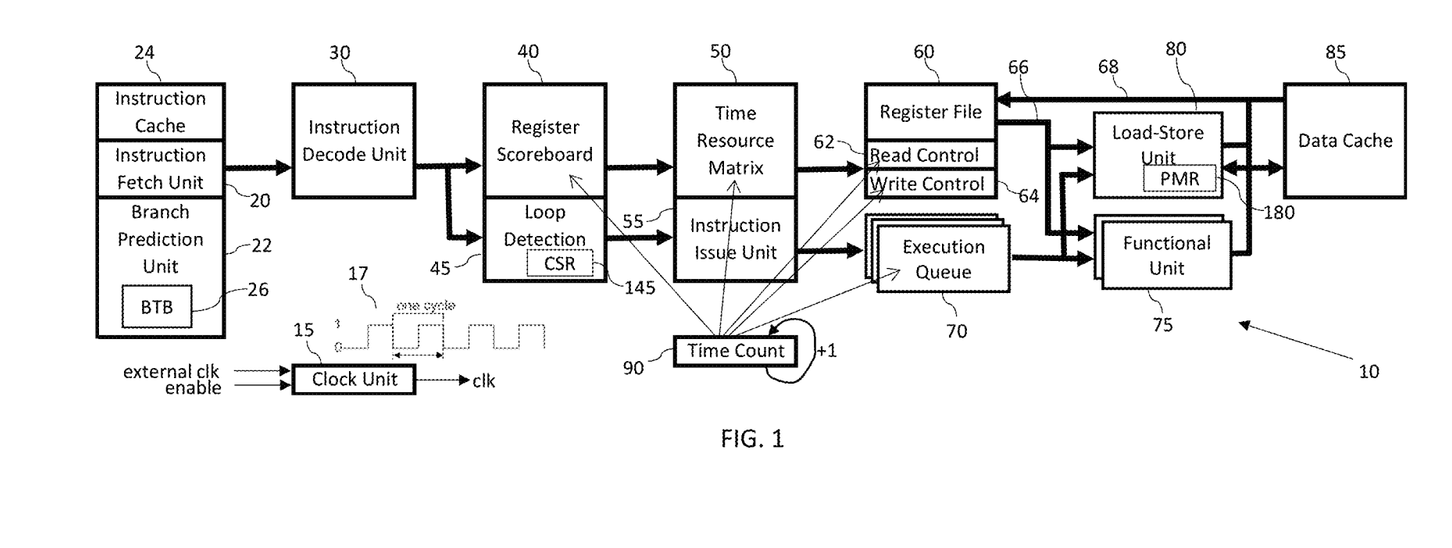
FIG. 1 is a block diagram illustrating a processor based data processing system in accordance with present invention.

FIG. 1 is a block diagram of a microprocessor based data processing system. The exemplary system includes a microprocessor 10 having a clock unit 15, an instruction fetch unit an instruction cache 24, a branch prediction unit 22, an instruction decode unit 30, a register scoreboard 40, a loop detection unit 45, a time-resource matrix 50, an instruction issue unit 55, a register file 60, a read control unit 62, a write control unit 64, a plurality of execution queues 70, a plurality of functional units 75, a load-store unit 80, and a data cache 85. The microprocessor includes a plurality of read buses 66 that provide data from the register files to the functional units 75 and load-store unit 80. The system also includes a plurality of write buses 68 to write result data from the functional unit 75, the load-store unit 80, and the data cache 85 to the register file 60. The microprocessor 10 is a synchronous microprocessor where the clock unit generates a clock signal ("clk") which couples to all the units in the microprocessor 10. The clock unit 15 provides a continuously toggling logic signal 17 which toggles between 0 and 1 repeatedly at a clock frequency. Clock output signal ("clk") of clock unit 15 enables synchronization of the many different units and states in the microprocessor 10. The clock signal is used to sequence data and instructions through the units that perform the various computations in the microprocessor 10. The clock unit 15 may include an external clock as an input to synchronize the microprocessor 10 with external units (not shown). The clock unit 15 may further include an enable signal to disable the clock unit when the microprocessor is in an idle stage or not in use for instruction execution.

According to an embodiment the microprocessor 10 also includes a time counter unit 90 which stores a time count incremented, in one embodiment, every clock cycle. The time counter unit 90 is coupled to the clock unit 15 and uses "clk" signal to increment the time count.

In one embodiment the time count represents the time in clock cycles when an instruction in the instruction issue unit 55 is scheduled for execution. For example, if the current time count is 5 and an instruction is scheduled to be executed in 22 cycles, then the instruction is sent to the execution queue 70 with the execution time count of 27. When the time count increments to 26, the execution queue 70 issues the instruction to the functional unit 75 for execution in the next cycle (time count 27). The time counter unit 90 is coupled to the register scoreboard 40, the time-resource matrix 50, the read control 62, the write control 64, and the plurality of execution queues 70. The scoreboard 40 resolves data dependencies in the instructions. The time-resource matrix 50 checks availability of the various resources which in one embodiment include the read buses 66, the functional units 75, the load-store unit 80, and the write buses 68. The read control unit 62, the write control unit 64, and the execution queues 70 receive the scheduled times from the instruction issue unit 55. The read control unit 62 is set to read the source operands from the register file 60 on specific read buses 66 at a preset time. The write control unit 64 writes the result data from a functional unit 75 or the load-store unit 80 or the data cache 85 to the register file 60 on a specific write bus 68 at a preset time. The execution queue 70 is set to dispatch an instruction to a functional unit 75 or the load-store unit 80 at a preset time. In each case, the preset time is the time setup by the decode/issue unit. The preset time is a future time based on the time count, so when the time count 90 counts up to the preset time, then the specified action will happen, where the specified action is reading data from the register file 60 writing data to the register file, or issuing instruction to a functional unit 75 for execution. The instruction issue unit 55 determines that an instruction is free of data dependencies and the resources are available at the "preset time" for the instruction to be executed in the execution pipeline.

In the microprocessor system 10 the instruction fetch unit 20 fetches the next instruction(s) from the instruction cache 24 to send to the instruction decode unit 30. More than one instruction can be fetched per clock cycle from the instruction fetch unit depending on the configuration of microprocessor 10. For higher performance, microprocessor 10 fetches more instructions per clock cycle for the instruction decode unit 30. For low-power and embedded applications, microprocessor 10 might fetch only a single instruction per clock cycle for the instruction decode unit 30. If the instructions are not in the instruction cache 24 (commonly referred to as an instruction cache miss), then the instruction fetch unit 20 sends a request to external memory (not shown) to fetch the required instructions. The external memory may consist of hierarchical memory subsystems, for example, an L2 cache, an L3 cache, read-only memory (ROM), dynamic random-access memory (DRAM), flash memory, or a disk drive. The external memory is accessible by both the instruction cache 24 and the data cache 85. The instruction fetch unit 20 is also coupled to the branch prediction unit 22 for prediction of the next instruction address when a branch is detected and predicted by the branch prediction unit 22. The branch prediction unit 22 includes a branch target buffer (BTB) 26 that stores a plurality of the entry-point addresses, branch types, offsets to exit-point addresses, and the target addresses of the basic blocks which will be discussed in detail later. The instruction fetch unit 20, the instruction cache 24, and the branch prediction unit 22 are described here for completeness of description of a microprocessor 10. In other embodiments, other instruction fetch and branch prediction methods can be used to supply instructions to the instruction decode unit 30 for microprocessor 10.

The instruction decode unit 30 is coupled to the instruction fetch unit 20 to receive new instructions and also coupled to the register scoreboard 40. The instruction decode unit 30 decodes the instructions for instruction type, instruction throughput and latency times, and the register operands. The register operands, as an example, may consist of 2 source operands and 1 destination operand. The operands are referenced to registers in the register file 60. The source and destination registers are used here to represent the source and destination operands of the instruction. The source registers support solving read-after-write (RAW) data dependencies. If a later instruction has the same source register as the destination register of an earlier instruction, then the later instruction has RAW data dependency. The later instruction must wait for completion of the earlier instruction before it can start execution. The register scoreboard 40 is used to keep track of the completion time of the destination registers of the earlier instructions. In the preferred embodiment the completion time is maintained in reference to the time count 90.

Each of the units shown in the block diagram of FIG. 1 can be implemented in integrated circuit form by one of ordinary skill in the art in view of the present disclosure. With regard to one embodiment of this invention, time counter 90 is a basic N-bit wrap-around counter incrementing by 1 every clock cycle. The time-resource matrix 50 is preferably implemented as registers with entries that are read and written as with a conventional register structure.

The integrated circuitry employed to implement the units shown in the block diagram of FIG. 1 may be expressed in various forms including as a netlist which takes the form of a listing of the electronic components in a circuit and the list of nodes that each component is connected to. Such a netlist may be provided via an article of manufacture as described below.

In other embodiments, the units shown in the block diagram of FIG. 1 can be implemented as software representations, for example in a hardware description language (such as for example Verilog) that describes the functions performed by the units of FIG. 1 at a Register Transfer Level (RTL) type description. The software representations can be implemented employing computer-executable instructions, such as those included in program modules and/or code segments, being executed in a computing system on a target real or virtual processor. Generally, program modules and code segments include routines, programs, libraries, objects, classes, components, data structures, etc. that perform particular tasks or implement particular abstract data types. The program modules and/or code segments may be obtained from another computer system, such as via the Internet, by downloading the program modules from the other computer system for execution on one or more different computer systems. The functionality of the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a non-transitory computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The aforementioned implementations of software executed on a general-purpose, or special purpose, computing system may take the form of a computer-implemented method for implementing a microprocessor, and also as a computer program product for implementing a microprocessor, where the computer program product is stored on a non-transitory computer readable storage medium and include instructions for causing the computer system to execute a method. The aforementioned program modules and/or code segments may be executed on suitable computing system to perform the functions disclosed herein. Such a computing system will typically include one or more processing units, memory and non-transitory storage to execute computer-executable instructions.

Figure 2A:
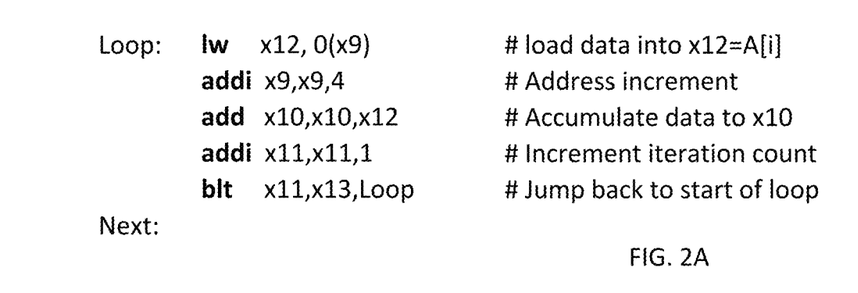
FIGS. 2A and 2B illustrate an example of loop used in an embodiment.
Figure 2B:
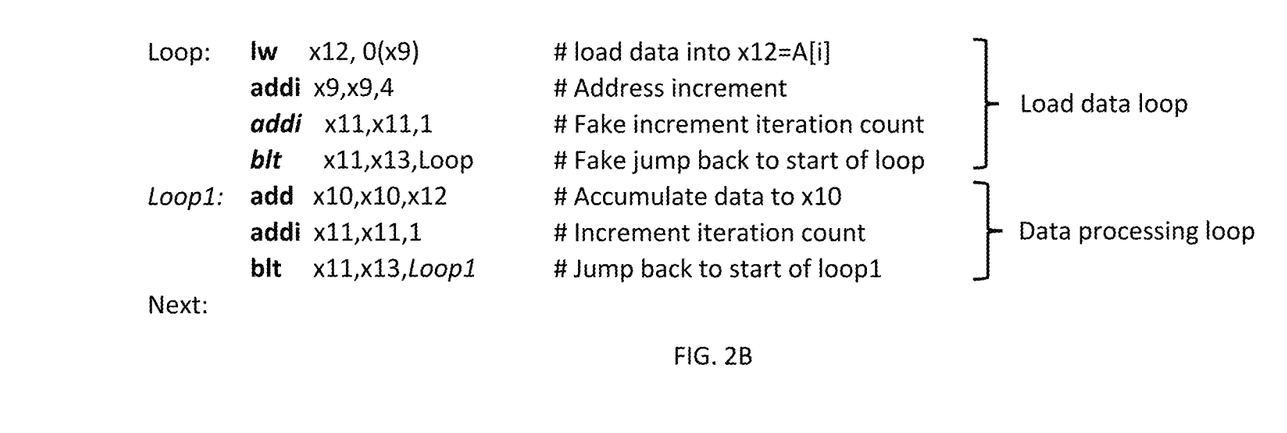

FIG. 2A is an example of a loop which may be executed by the processor 10. The example shows accumulation of load data into a register. Such a loop can be detected by the loop detection unit 45 as a loop that can be executed out-of-order (OOO), in other words that one iteration of a loop (e.g., iteration 4) can be executed out-of-order with respect to a prior iteration (e.g. iteration 3). The loop detection unit 45 breaks the loop into two smaller loops as illustrated in FIG. 2B. The two smaller loops (Loop-1 and Loop-2) in FIG. 2B are a conceptual view of the loop, but the loop operation in the microprocessor 10 does not execute the two additional instructions labeled '#Fake' in the load data loop. Loop detection is performed in the branch execution unit (one of the functional units 75) by keeping track of the entry point address for comparison to the target address of the branch. The first time the loop is detected, execution of the loop will go back to the instruction fetch unit 20 and branch prediction unit 22. The loop instructions are fetched again and predicted by the branch prediction unit 22. When the loop instructions go through the loop detection unit 45 on a second iteration of the loop, the loop detection unit 45 determines if the loop can be executed as an OOO loop. The loop may be detected and issued from the instruction fetch queue (not shown) in the instruction fetch unit 20 where the instruction queue is the instruction loop buffer. If a loop is not an OOO executable loop, then the loop detection unit 45 does not issue loop instructions. The loop causes the instruction loop buffer in the instruction queue to issue only one iteration. The loop must be executed a first time to be detected by the loop detection unit 45 and set up the OOO loop operation.

To be executable OOO a loop must include no more than one load instruction. Moreover, there needs to be sufficient resources for execution of the loop and for execution of a non-loop instruction concurrently with the loop. In the example shown in FIGS. 2A and 2B, the smaller loops consist of a load operation and an arithmetic operation. Each loop iteration includes at most one load instruction and the address increment or decrement for each loop iteration. The arithmetic operation may include one or more arithmetic instructions. An OOO executable loop is detected by two steps. The first step is to identify a loop, which is accomplished by identifying that the branch target address is the same as the start address of the loop. Once the loop is identified, information pertaining to the loop is written into the BTB 26 of the branch prediction unit 22. Such loop information can include but is not limited to the branch type, and distance from start to end address. The second step is to detect that the loop can be executed OOO. Once the loop is predicted by the branch prediction unit 22, the loop detection unit 45 detects a single load instruction and the source operand register which is used for address calculation of the load instruction. These two instructions are part of the load data loop in FIG. 2B. If a second load instruction is detected in the loop, then the loop cannot be executed OOO. The arithmetic operation includes instructions that are not part of the loop overhead instructions or the load operation instructions. The arithmetic operation instructions are part of the data processing loop in FIG. 2B. Note that the ordering of the load and arithmetic operations are not necessary in strict order.

In this example, the instruction in the loop that can be executed OOO is the load data from the load data loop that can be fetched out-of-order. This load data operation is processed immediately by the data processing loop. The loop count is stored in register x13. The load data loop is setup in the execution queue 70 with the loop count to fetch the load data independently from the data processing loop. The resources for executing the OOO loop may consist of some the read buses 66, the write buses 68, the functional units 75, and the load-store ports of the load-store unit 80. In one embodiment, the load data and accumulative result data are written to the register file 60 once on the last iteration of the loop. In another embodiment, the data processing loop is stalled in the instruction issue unit 55 until valid data is received from the load-store unit 80. This loop example will be referenced throughout the description below.

The OOO loop can be more complicated than the example above. Because the ordering of load data is not important, the loads can be fetched out-of-order. A data cache miss can return data at later time, while a later load with a data cache hit sends data to the data processing loop at an earlier time. For non-cacheable load instructions, the routing through many nodes of the memory subsystem can fetch data with different load latency. The external memory data are returned at arbitrary time and can be sent to the data processing loop out-of-order. Because the ordering of external load data is not necessary, the load-store unit 80 can send many external memory requests without any identification (ID) to keep track of the order of load requests. The count of load requests is tracked by the load-store unit 80. In the example, the load and address increment instructions are at the beginning of the loop which simplifies the loop detection unit 45, allowing it to separate the load data loop and the data processing loop. A compiler could be used to structure the loop as in the example of FIG. 2A.

In the loop example, one of the source registers is the same as the destination register for each of the loop count increment instruction, the address increment instruction, and the accumulate instruction. The accumulate instruction is adding a first register value to a second register value and writing back to the first register. The increment/decrement instruction is adding a first register value to a positive/negative immediate data and writing back to the first register. In these cases, a self-forwarding path is built into the functional unit or the address generation unit for the OOO loop operations. The result data is routed back to the first source operand data of the functional unit. The second source operand data is from the immediate data or a second source register.

In one embodiment, the loop type can be configured for OOO execution. For example, memory copy, floating-point accumulation, and vector accumulation operations can be configured to be executed as OOO loops. The rounding of a floating-point multiply-accumulate would ultimately be within an acceptable error margin, however, a user may choose to exclude floating-point operations as OOO loops. The loop detection unit 45 includes a control and status register (CSR) 145 to disable/enable loops to be detected as OOO loops. The load-store unit 80 includes physical memory registers (PMR) 180 to further disable/enable a memory region for OOO loop execution. The PMR 180 may include a physical memory attribute (PMA) and physical memory protection (PMP) for memory regions which may include disable/enable bits for OOO execution of certain loop types. The load/store addresses access the PMR 180 in the first iteration of the loop and can disable/enable the OOO loop detection by the loop detection unit 45.

In one embodiment, the load-store unit 80 consists of an address generation unit (not shown) that calculates addresses before accessing the data cache 85. In the example of FIG. 2A, a first optimization of the loop is merging of the address increment instruction with the load/store instruction. In such an example, the second instruction can be merged with the load instruction where the address increment is handled by the address generation unit of the load-store unit 80. It is noted that the load instruction may have non-zero immediate data in which case the address increment instruction cannot be merged with the load instruction. The loop count is used in the load-store execution queue 70 to count down the number of times the load instruction is executed by the load-store unit 80 and to write to the register file 60 when the loop count is zero, upon the last iteration. If all the load data are in the data cache 85, then the load data are in order and valid every clock cycle. Alternately, a cache miss will cause the load data to be out-of-order with respect to subsequent cache hit load data. The load instructions can continue to access the data cache 85 without stalling. Similarly, non-cacheable load requests are sent to external memory without stalling, so long as the number of outstanding load requests is within the capacity of the external memory controller. The load-store unit 80 keeps count of outstanding load requests and decrements as load data is returned from external memory. Data can be returned at any time and sent to the data processing loop.

Figure 3:
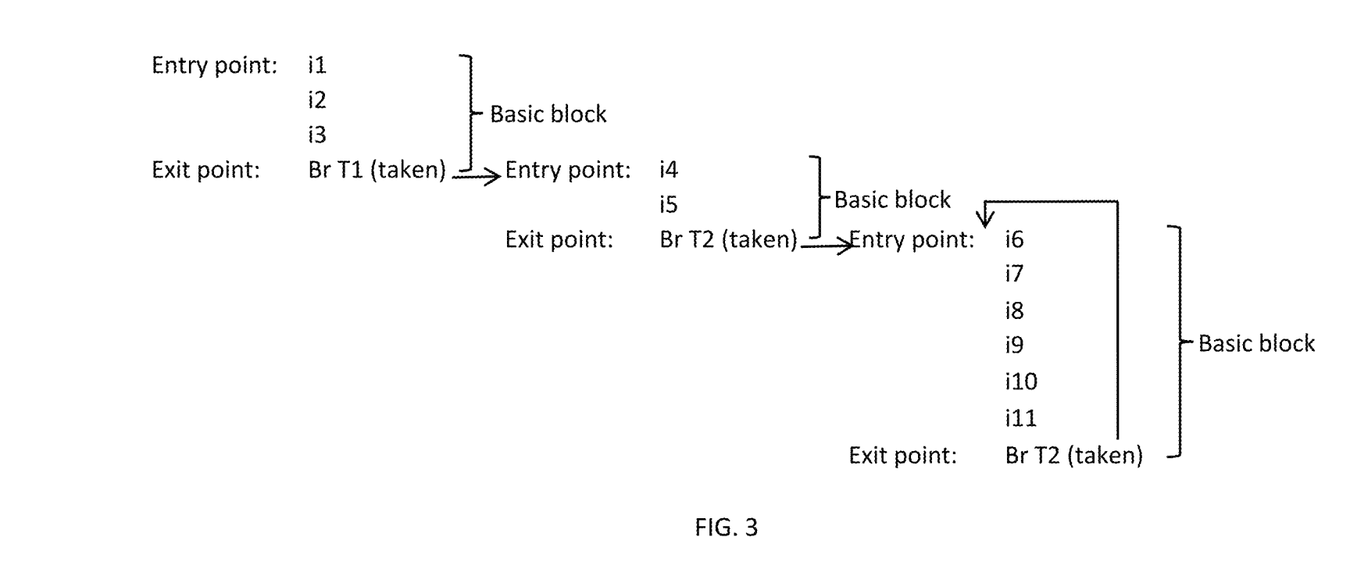
FIG. 3 illustrates a disclosed basic block concept for branch prediction.

In one embodiment, the branch prediction unit 22 is implemented in accordance with a basic-block algorithm. Examples are shown in FIG. 3. In the examples of FIG. 3, the first basic block has 4 instructions, the second basic block has 3 instructions, and the third basic block has 7 instructions. The branch target address of the third basic block is the entry point of the same basic block which is an indication of a loop. With basic-block branch prediction, the loop will be detected and marked as such in the branch target buffer 26. The branch prediction is based on the entry point of the basic block with an offset to the exit point or the location of the taken branch instruction. The entry point address is used to look up in a branch target buffer 26 of the branch prediction unit 22 to predict the target address of the branch instruction at the exit point of the basic block. The target address of the predicted taken branch is the entry point of the next basic block to predict the next target address. An offset from the entry point is included in the branch target buffer 26 to locate the exit point or the branch instruction of the basic block. The branch prediction unit 22 predicts all loops and adds more information in the branch target buffer 26 for the loop types. The loop execution exits to the sequential instruction after the loop indicated as "Next" in the loop examples of FIG. 2A and FIG. 2B. The OOO loop is detected and the entry point and offset are written to the branch target buffer 26. The OOO loop becomes a series of micro-operations corresponding to instructions in the loop. In one embodiment, the loop is predicted as a non-taken prediction by the branch prediction unit 22. The sequential instructions after the OOO loop can be fetched and executed concurrently with the execution of the loop.

Referring back to FIG. 1, a loop is detected by the branch prediction unit 22 and fetched by the instruction unit 20 and the corresponding instructions are provided to the instruction decode unit 30. The loop instructions are provided to the register scoreboard 40 and the loop detection unit 45. The loop detection unit 45 detects the loop based on the reserved resources for loop execution. For example, if two ALUs are reserved for the OOO loop operations, then the loop should not have more than two ALU instructions. Other reserved resources are read buses 66, write buses 68, load store port in the load store unit 80. In one embodiment, the first iteration of the loop is normally executed while the loop is being detected as an OOO loop by the loop detection unit 45. If the loop is identified as an OOO loop, then the second iteration is the beginning of the OOO loop operation. The loop detection unit 45 detects (1) a branch instruction, which register is used for the loop count, and captures the loop count value, (2) the loop count increment/decrement instruction, (3) the load instruction, the address increment instruction and the immediate data for setting up the load data loop, (4) all other instructions for setting up the data processing loop.

In another embodiment, the OOO execution loop is marked as such in the branch target buffer of the branch prediction unit 22. The loop entry in the branch target buffer has sufficient information so that the OOO loop begins execution immediately without going through the loop detection unit 45. Assuming the number of instructions in the loop is less than 16, 4 bits are needed for the offset from the entry point of the basic block to locate the instructions in the loop. The OOO loop entry in the branch target buffer includes the offset for self-increment and accumulative instructions and resources required for the OOO loop.

Figure 4:
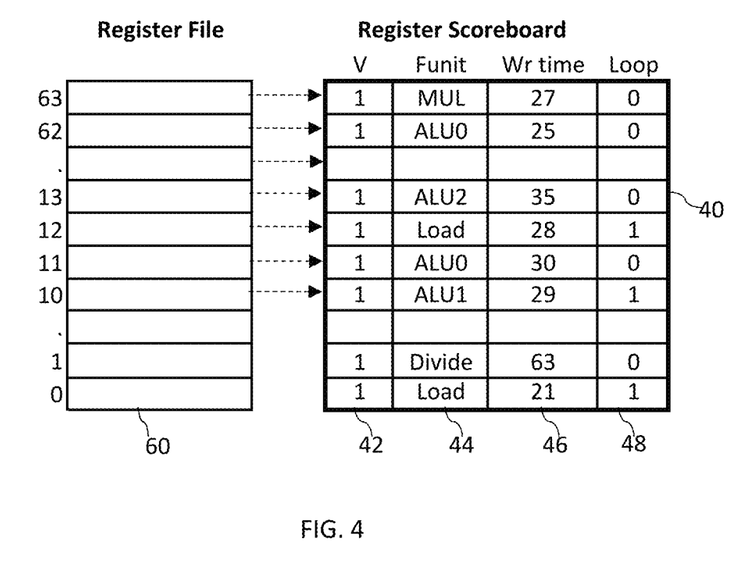
FIG. 4 is a block diagram illustrating a register file and a register scoreboard.

FIG. 4 illustrates the register file 60 and the register scoreboard 40. In one embodiment, the register file 60 has 64 registers, numbered as registers 0 to 63 as illustrated. Each register in the register file 60 has a corresponding entry in the register scoreboard 40. The register scoreboard 40 stores the pending write status for the registers 60. A valid bit field 42 indicates a valid write back to the register file 60 at a future time in reference to the time count 90, as specified by the write time field 46 from a specific functional unit in the "Funit" field 44. As examples illustrated in FIG. 4, register 0 is written back at time count 21 from the load-store unit 80. Register 1 is written back at time count 63 from the divide unit (one of the functional units 75). Register 10 is written back at time count 29 from the ALU1, (another of the functional units 75), etc. as illustrated in FIG. 4. The write time 46 is the time in reference to the time count 90. The result data is written to the register file 60. The data are not available from the register file 60 until the next clock cycle, but the result data can be forwarded from the functional unit 44 designated in the register scoreboard 40. For example, if the value of the time count 90 is 19, then the load-store unit 80 produces the result data in 2 clock cycles for writing back to the register file 60.

The registers may be assigned to an OOO loop operation designated by the loop bit field 48 of the register scoreboard 40. As examples illustrated in FIG. 4, the data in registers 10 and 12 are part of the OOO loop when the loop bits 48 are set. Setting of the loop bit 48 means that result data is not written back to the register file 60 until the last iteration of the OOO loop. The loop bit 48 is then reset by the execution unit 70. Because the result data are forwarded directly from the functional unit 44 to the source data of the next functional unit, writes to and reads from the register file 60 are not necessary. In one embodiment, the result data are written back to the register file 60 every clock cycle, ignoring the setting of the loop bits 48. The advantage is related to an exception where the register file 60 has the latest result data before the exception. In another embodiment, the functional units 75 and the load-store unit 80 keep last valid result data to write back to the register file 60 on exception. If there is no exception, then it is possible to wait to write until the last iteration. An exception means that the loop is disrupted by an unexpected event and must stop before the last iteration. Therefore, updating the register file every clock cycle ensures that the register file is updated before the exception. Otherwise, on exception, the latest valid result must be forced to be written to the register file before taking the exception.

In another embodiment, the write times 46 of registers 10 and 12 are incremented every clock cycle as long as the loop bits 48 are set. For example, for register 12, when the time count is 28, the valid bit 42 remains set and the write time 46 is incremented as long as the loop bit 48 is set. On the last iteration of the loop, the load-store execution queue 70 resets the loop bit 48 to allow writing back to the register file 60. Similarly, the ALU execution queue 70 resets the loop bit 48 for register 10. The write time 46 functionality is the same as other non-loop entries. If the load data is not in the data cache 80, then the load-store unit 80 modifies the write time with the L2 cache latency time. It is important only for the last load data to update register 12 of the register file 60. The write time 46 is incremented based on the write control unit 64 unless there is a data cache miss in which case the L2 cache latency is used. A read bus 66 is reserved for sending data from the load-store unit 80 (as part of the load data loop in FIG. 2B) to the arithmetic (ALU or MUL) execution queue 70 (as part of the data processing loop in FIG. 2B).

The execution queue 70 receives load data from the load data loop and dispatches the load data to the functional unit 75 for execution as part of the data processing loop. The forwarding of data from the load data loop to the arithmetic execution queue is part of the loop execution which is not necessary for the read control unit to access the register scoreboard 40 for read time on every loop iteration. This is discussed further below in conjunction with FIG. 7.

The write time of a destination register is the read time for the subsequent instruction with RAW data dependency on the same destination register. Referring back to FIG. 1, the source registers of an instruction in the instruction decode unit 30 access the register scoreboard 40 for the read times. If the valid bit 42 of a source register is not set in the register scoreboard 40, then the required data is in the register file 60 and can be accessed at any time providing availability of the read buses 66, else the write time 46 is the earliest time to issue the instruction.

An instruction reads source operand data at read time, executes the instruction with a functional unit 75 at execute time, and writes the result data back to the register file 60 at write time. The write time is recorded in the write time field 46 of the register scoreboard 40. With 2 source registers, the instruction selects the later write time from the register scoreboard 40 as the read time for the instruction. In one embodiment, the load and store instructions are executed in order to simplify the data dependencies of the load and store instructions. The load instruction may read from the same address as the previous store instruction in which case the data are forwarded from the store instruction instead of reading from the data cache 85. The load store unit keeps track of the order of load and store instructions for correct processing of data dependencies. Keeping the order of load and store instructions in the execution queue 70 allows the addresses to be calculated in order for any data dependency. The load-store execution queue (one of the plurality of execution queues 70) keeps the latest busy time of the load or store instructions. The read time of a load or store instruction is determined from the write times 46 of the source registers from the register scoreboard 40 or the latest busy time of the load-store execution queue 70. In another embodiment, the resources (read buses, write buses, and functional units) also have associated with them the latest busy times which are needed for an OOO loop. The resources are reserved and used every clock cycle for OOO loop operations until the completion of the loop. The OOO loop can start after the latest busy time of all necessary resources. The execute time is the read time plus 1 time count where the functional unit 75 or the load-store unit 80 starts executing the instruction. The write time of the instruction is the read time plus the instruction latency time. If the instruction latency time is 1 (e.g., an ALU instruction), then the write time and execution time of the instruction are the same.

Each instruction has an execution latency time. For example, the add instruction has a latency time of 1, the multiply instruction has a latency time of 2, and the load instruction has a latency time of 3 assuming a data cache hit. If the current time count is 5 and the source registers of an add instruction receive write time counts of 22 and 24 from the register scoreboard 40 to write into the source registers, then the read time count is set at 24. In this case, the execution and the write time counts are both 25 for the add instruction. As shown in FIG. 1, the register scoreboard 40 is coupled to the time-resource matrix 50 where the read, execute, and write times of an instruction access the time-resource matrix 50 for availabilities of the resources.

Figure 5:
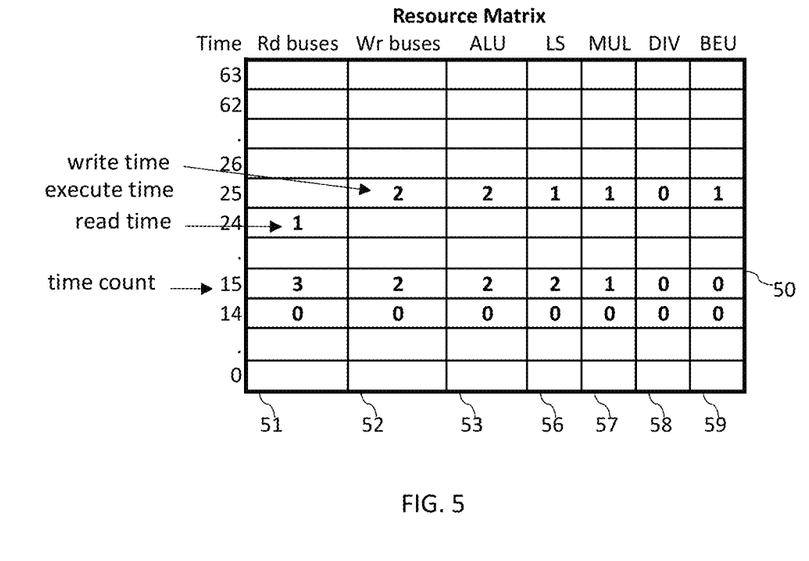
FIG. 5 is a block diagram illustrating a time-resource matrix.

FIG. 5 illustrates the time-resource matrix 50. The time-resource matrix 50 preferably includes the same number of time entries as the time counter 90. For example, if the time counter is 64 cycles, then the time-resource matrix 50 has 64 entries. The time counter is incremented every clock cycle and rotates back from the 63rd entry to the 0th entry. The columns in the time-resource matrix 50 represent the available resources for the read buses 51, the write buses 52, the ALUs 53, the load-store ports 56, the multiply unit 57, the divide unit 58, and the branch execution unit (BEU) 59. If other functional units are provided by microprocessor 10 those are also included in the resource matrix 50.

The read buses column 51 corresponds to the plurality of read buses 66 in FIG. 1. The write buses column 52 corresponds to the plurality of write buses 68 in FIG. 1. The ALUs column 53, the multiply column 57, the divide column 58, and the branch execution unit column 59 correspond to the plurality of functional units 75 of FIG. 1. The load-port ports column 56 corresponds to the load-store unit 80 of FIG. 1.

FIG. 5 also shows an example of the information stored in the time-resource matrix Shown is data with a read time count of 24, an execution time count of 25, and a write time count of 25. When an instruction accesses the time-resource matrix 50 for availability of resources, the matrix 50 shows that at read time 24, 1 read bus is busy. At execution time 25, 2 ALUs, 1 load-store port, 1 multiply unit, and 1 BEU are taken for execution of previous instructions, and at write time 25, 2 write buses are busy. In one embodiment, the numbers of read buses, write buses, ALUs, load/store ports, multiply unit, divide unit, and BEU are 4, 4, 3, 2, 1, 1, and 1, respectively. If an add instruction with 2 source registers and 1 destination register is issued with a read time of 24, an execution time of 25, and a write time of 25, then the number of read buses 51 at time 24, write buses 52 at time 25, and ALUs 53 at time 25 are incremented to 3, 3, and 3, respectively. The read bus 51 indicates that 1 read bus is busy, so the next 2 read buses 1 and 2 (in-order) are assigned to the source registers of the add instruction. The ALU unit 53 indicates that 2 ALUs are busy, so the next in-order ALU 2 is assigned as the functional unit for execution of the add instruction. The write bus 52 indicates that 2 write buses are busy, so the next in-order write bus 2 is assigned to write back data from ALU 2 to the register file 60.

In one embodiment, resources are in-order assigned to the instructions. The source registers of the add instruction will receive data from read buses 1 and 2, ALU 2 is used for execution of the add instruction and write bus 2 is used to write back data from ALU 2. The counts in the row are reset by the time count. As illustrated in FIG. 5, when the time count is incremented from 14 to 15, all resource counts of row 14 are reset. All resource counts of row 15 are reset when the count is incremented to 16 in next cycle. If an issued instruction is a multiply instruction with execution time of 25, because there is only one multiply unit 57, the issued instruction cannot be issued for execution time of 25. If the number of busy resources is equal to the maximum allocated resources, then the instruction cannot be issued in the same cycle. In another embodiment, two sets of read times, execution times, and write times are used per instruction with an expectation that one set of times is free of conflict, increasing the chance for issuing an instruction. In another embodiment, the counts 51, 52, 53,56, 57, 58, and 59 indicate the number of available resources. The resource counts are decremented if the resource is assigned to an issue instruction.

In one embodiment, some resources are reserved for the OOO loop operations. For example, the last 2 read buses (read buses number 2 and 3) out of 4 read buses are used for the OOO loop operations. The OOO loop operation cannot start until the latest busy time of the read buses 2 and 3. During the OOO loop operation, the time-resource matrix 50 adjusts the maximum available read buses to two for issuing subsequent instructions after the OOO loop. The instructions after the OOO loop can be concurrently executed with the OOO loop operations. The loop detection unit 45 determines the resources needed for the OOO loop operations which may include the read buses, the write buses, and functional units. The number of reserved resources limits the loop to be detected as OOO loop by the loop detection unit 45. The earliest time to start the OOO loop operation is based on the latest busy times of all required loop resources. The resource latest busy times are in addition to the write times 46 of the source registers from the register scoreboard 40 to determine the first read time of the OOO loop operation.

The write bus 52 is not needed by the OOO loop operations, and no write bus is reserved for the OOO loop operations until the last iteration of the loop. The execution queue 70 checks the write bus 52 of the time-resource matrix 50 on the last iteration of the loop to write back to the register file 60. In another embodiment, a write bus 52 is reserved as part of the required resources to be used by the last iteration of the OOO loop. All the required resources for OOO loop operation are no longer part of the time-resource matrix 50 and the time-resource matrix 50 adjusts the maximum available resources.

All available resources for the required times are read from the time-resource matrix and sent to the instruction issue unit 55 for a decision of when to issue an instruction to the execution queue 70. If the resources are available at the required times, then the instruction can be scheduled and sent to the execution queue 70. The issued instruction updates the register scoreboard 40 with the write time and updates the time-resource matrix 50 to reduce the available resource values. All resources must be available at the required time counts for the instruction to be dispatched to the execution queue 70. If all resources are not available, then the required time counts are incremented by one, and the time-resource matrix is checked as soon as the same cycle or next cycle. The particular number of read buses 66, write buses 68, and functional units 75 in FIG. 1 is preferably chosen to minimize stalling of instruction in the instruction issue unit 55.

Figure 6A:
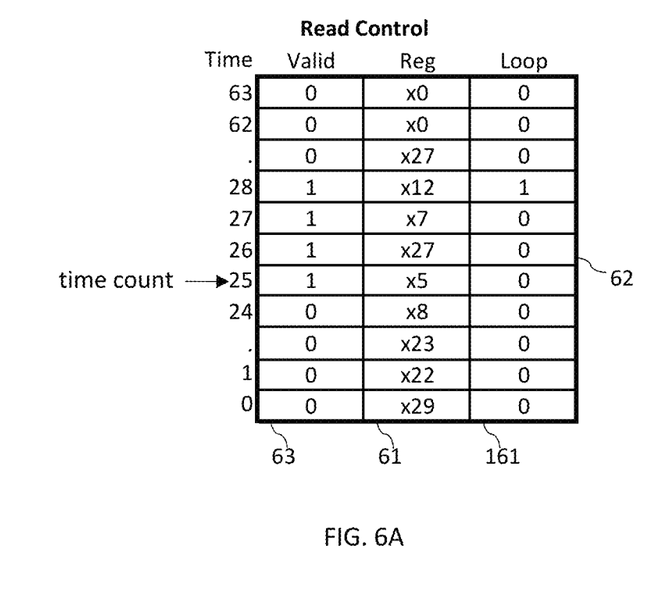
FIGS. 6A and 6B are block diagrams illustrating a read bus control and a write bus control operation.
Figure 6B:
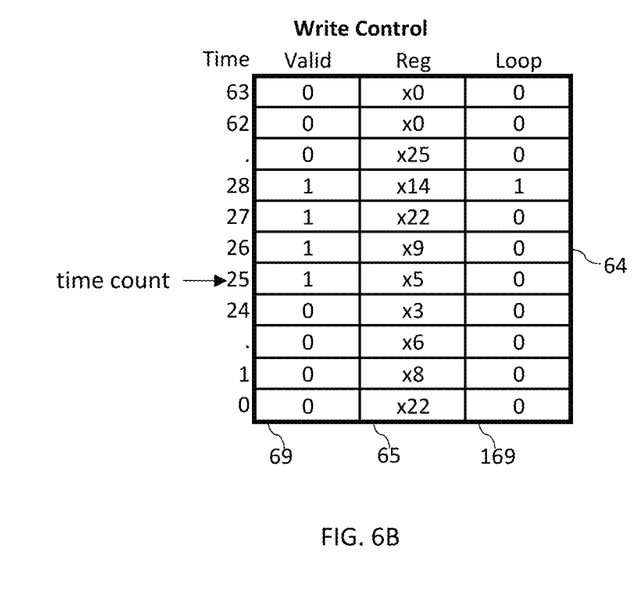

FIG. 6A illustrates a single read bus of the read control unit 62 and FIG. 6B illustrates a single write bus of the write control unit 64. The read control unit 62 and the write control unit 64 include a number of time entries to match the time counter 90. As mentioned above, in a preferred embodiment the time count is incremented every clock cycle. The columns in the read control unit 62 represent the valid bit 63, the source registers 61, and the loop bit 161. The columns in the write control unit 64 represent the valid bit 69, the destination registers 65, and the loop bit 169. When the time count is incremented from 24 to 25, the valid bits 63 and 69 of row 24 are reset to indicate that those resources have been freed up. The valid bits 63 and 69 of row 25 are reset when the count is incremented to 26 in the next cycle. FIGS. 6A and 6B show a single read bus 66 and a single write bus 68, respectively. If 4 read buses and 3 write buses are implemented, then the functionality of FIGS. 6A and 6B are duplicated 4 times and 3 times, respectively. In one embodiment, the OOO loop operations use the read control unit 62 to forward data from a first functional unit 75 or load-store port 80 to another functional unit or load-store port. The loop bit 161 of the read control unit 62 indicates the start of the OOO loop operation. In the example illustrated in FIG. 6A, the OOO loop starts at time count 28 where the loop bit 161 is set. When the time count is 28, the loop bit 161 causes all the valid bits 63 to be set and the data x12 in the register 61 to be copied to all entries. In another embodiment, because the time-resource matrix blocks any instruction from using this read port 62, a loop active bit and data x12 can be used for every cycle of OOO loop operations, instead of accessing the read port 62 every clock cycle. The read port 62 is now dedicated to OOO-loop operation where the data and valid signal from the first functional unit or load-store port are sent to the second functional unit or load-store port. In FIG. 6B, the loop bit 169 is set at time 28 to reserve the write bus 64 for writing back data on the last iteration of the OOO loop at which time all loop destination registers are written back to the register file 60 including the last load-store address, the loop count, the load data, and the accumulative result data.

In the example illustrated in FIG. 6A, at the time count of 25 in the read control unit 62 the data in register x5 from the register field 61 of the read control 62 is used to read the entry 5 from the register scoreboard 40 for the "Wr time" 46 and the "Funit" 44. If the write time 46 is the same as the time count 90, then the result data is written back to the register file 60 in the same clock cycle. The result data from the "Funit" 44 can be forwarded to the read bus 66 by the "Funit" 44 instead of being read from the register file 60. The write time 46 may have changed due to a cache miss of the load instruction, in which case the instruction cannot be executed yet because the source operand data is not valid. The read after write (RAW) dependent instruction is rescheduled to be executed at a later time. In the next cycle, when the time count is 26, the data in register x27 from the register field 61 is used to read from the register file 60. The read control unit 62 is responsible for supplying the source operand data on a specific one of the read buses 66. The execution queue 70 keeps the information of which one of the read buses 66 is to receive source operand data. The execution queues 70 and read control unit 62 are synchronized based on the time-resource matrix 50. The read control unit 62 operates to provide centralized control for the read buses 66, thus reducing complexity from the hundreds of instructions in dynamic scheduling architectures.

Similarly in FIG. 6B, the data in register x5 from the register field 65 of the write control unit 64 at time count of 25 is used to write to the register file 60. The register data x5 will also access the "Funit" 44 of the register scoreboard 40 to get the result data from a specific functional unit 75. Again, the execution queues 70, the functional units 75, and the write control unit 64 are synchronized to transfer result data on a write bus 68 to write to the register file 60. In one embodiment, the valid (valid bit field 69) register 65 of write control unit 64 is responsible to clear the valid bit 42 from the register scoreboard 40 of FIG. 4 if the corresponding "Wr time" field 46 is the same as the time count 90. It is possible that the write time 46 of the register scoreboard 40 has been modified due to a delay in the write time. An alternative is to compare the current time count to all "Wr time" fields 46 of the register scoreboard 40 and to clear the valid bit 42 for matching times. This alternative results in higher power consumption, for example, if there are a large number of registers in the register scoreboard 40. In one embodiment, the write to the register file is blocked if the loop bit 169 is set. The loop bit 169 is reset on the last iteration of the OOO loop operation to allow writing back to the register file 60 as normal. The write control unit 64 operates as a centralized control for the write buses 68 which removes complexity, particularly compared to distributing such control among the plurality of functional units in dynamic scheduling.

Figure 7:
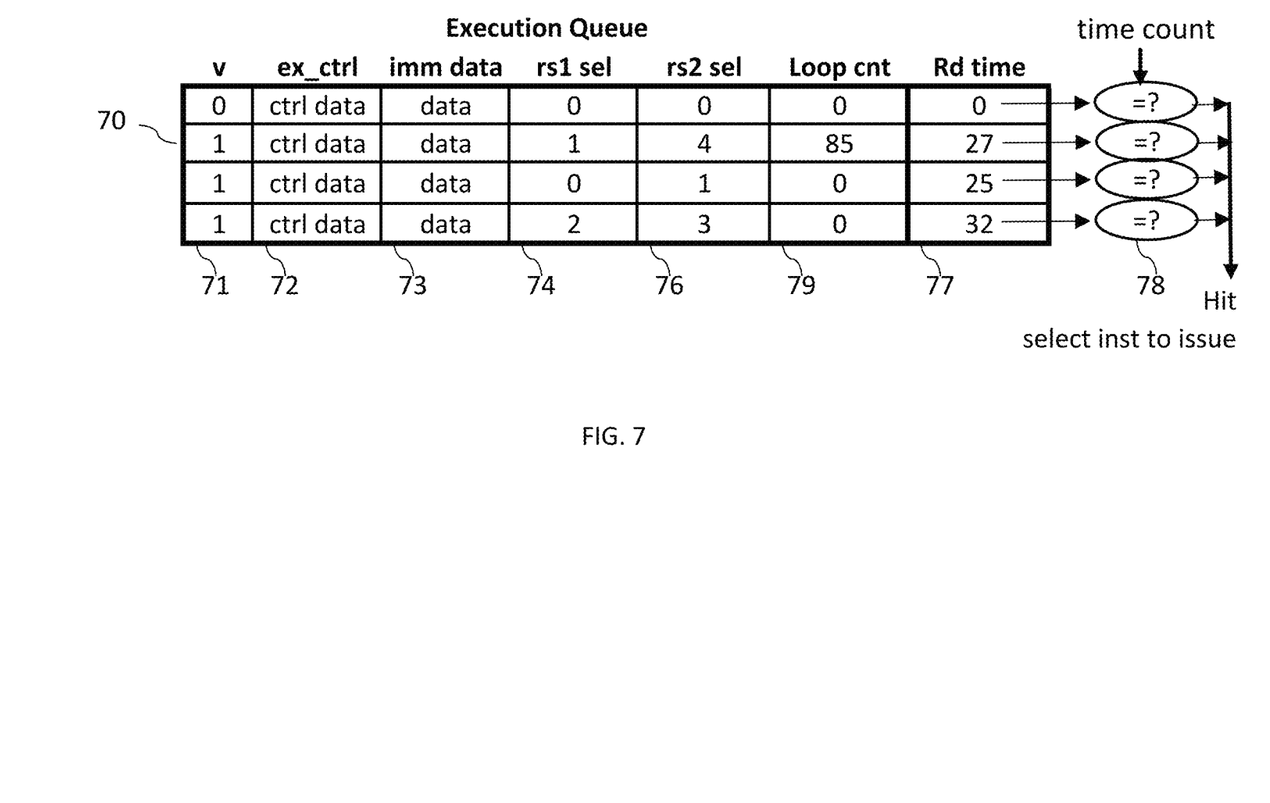
FIG. 7 is a block diagram illustrating an execution queue.

FIG. 7 illustrates an example of a 4-entry execution queue 70. The number of entries for the execution queue 70 is only an illustration. The invention is not limited to any number of execution queue 70 entries and the execution queue 70 could take the form of a single-entry execution queue. Each entry is an instruction waiting for execution by one of the functional units or the load/store unit 80 according to the time count in the read time column 77. Each entry in the execution queue 70 preferably consists of the following fields: the valid bit 71, control data 72, the immediate data 73, the first source register select 74, the second source register select 76, the loop count 79, and the read time 77. The valid bit 71 indicates that the entry is valid in the execution queue 70. The control data 72 specifies the specific operation to be used by the functional units 75 or the load/store unit 80. The immediate data 73 is an alternative to the second source register for the instruction. The valid indication for the immediate data 73 may be included in the control data field 72. Most instructions have an option to use immediate data 73 instead of data from the second source register. The first source register select 74 identifies which one of the read buses 66 has the operand data for the first source register. The second source register select 76 identifies which one of the read buses 66 has the operand data for the second source register. The source register selects 74 and 76 may not be used for some instructions. For an OOO loop, the loop count field 79 is written when the OOO loop instruction is issued to the execution queue 70. In addition, the immediate field 73 is updated with the loop incremented value from the address incremented instruction of the OOO loop. It is noted that the load instruction may have non-zero immediate data in which case the address increment instruction is treated as an independent instruction and executed in another ALU functional unit 75. Another read control port 62 is used for transferring data from the ALU functional unit 75 to the load-store unit 80. The valid/acknowledge protocol may be used for transferring addresses from the ALU functional unit to the load-store unit 80 where the valid data from ALU functional unit 75 must be accepted by the load-store unit 80 before calculating the next address. The load-store unit 80 is not stalled due to a cache miss because of the OOO loop operation. Thus, the address increment can continue until completion of the loop unless there are enough data cache misses to fill up the data prefetch buffer (not shown) and require draining of the data prefetch buffer to the data cache 85. The address increment is stalled in the execution queue 70 when the data prefetch buffer is full. The execution queue 70 may include additional fields for writing back the last address of the address increment instruction and the last loop count value to the register file 60. On a data cache miss, the request is sent to the L2 cache. The load data skips one cycle of sending valid data to the data processing loop. Assuming the subsequent loads are hits in data cache 85, then the cache miss data wait until the end of all the cache hit data to be sent to the data processing loop. The first data cache miss may fill into the spot of the second data cache miss.

Note that the destination register can be, but does not need to be, kept with the instruction. The write control unit 64 is responsible for directing the result data from a functional unit 75 to a write bus 68 to write to the register file 60. The execution queues 70 are only responsible for sending instructions to the functional units 75 or the load-store unit 80. The read time field 77 which has the read time of the instruction is synchronized with the read control unit 62. When the read time 77 is the same as the time count 90 as detected by the comparators 78, the instruction is issued to the functional units 75 or the load/store unit 80. For the example in FIG. 7, the entries are issued to the functional units out-of-order. The read time field 77 indicates that the second entry is issued at time count 25, the third entry is issued at time count 27, and the first entry is issued at time count 32.

In an embodiment, each functional unit 75 has its own execution queue 70. In another embodiment, an execution queue 70 dispatches instructions to multiple functional units 75. In this case, another field (not shown) can be added to the execution queue 70 to indicate the functional unit number for dispatching of instructions.

Referring back to FIG. 1, the execution queues 70 are coupled to the load store unit (LSU) 80 and the functional units 75. The execution queues 70 issue the instructions to the functional units 75 or the load/store unit 80 when the read times 77 are the same as the time count 90. If the instruction is a load/store, then it is dispatched to the LSU 80, else it is dispatched to one of the functional units 75. The LSU 80 and functional units 75 are also coupled to the read buses 66 and write buses 68 to access the register file 60. The source operand data are fetched from register file 60 and transported on read buses 66 to the LSU 80 and functional units 75. The result data from the LSU 80 and functional units 75 are transported on write buses 68 to write to destination registers in the register file 60. The LSU 80 is also coupled to the data cache 85. The LSU 80 executes the load and store instructions to read and write data from the data cache 85. If the data are not in the data cache 85, then the cache miss causes that cache line to be fetched from external memory (not shown). Typically, the functional units 75 perform different operations, e.g., ALU, multiply, divide, branch, etc. In other embodiments, the functional units 75 perform the same function, for example, multiple ALUs. Furthermore, the invention is not limited to integer functional units. In other embodiments the functional units include floating point units, digital-signal processing units, vector processing units, or custom designed units.

The loop detection unit 45 detects the OOO executable loop based on the number of available resources and restrictions. For example, the resources are locked up during loop operation, so there should be sufficient to execute instructions outside of the loop. For example, if there is only 1 MUL functional unit, then if there is a MUL instruction in the loop, then the loop cannot be designated as an OOO executable loop.

A number of read buses 66, a number of write buses 68, a number of functional units 75, and/or load-store port of load-store unit 80 are reserved for OOO loop operations. The execution queue 70 keeps track of the loop count and dispatches loop instructions to the functional units 75 and/or the load-store unit 80.

The examples in FIG. 2 are used for illustration and do not restrict a particular type of loop that could be an OOO loop. The OOO loop may be a search loop without a loop count where the exiting condition is data matching with data in a register in the register file 60. For the search loop, the loop count 79 in the execution queue 70 is set to maximum value and counting down of the loop counter is disabled so that the loop counter does not count down on each iteration. The functional units 75 and/or the load-store port 80 keep the last valid result data to be written back to the register file 60 in case of an exception or the exiting condition of the loop. A microprocessor has been described for illustration of the OOO loop operation described here, but the OOO loop can be used in a vector processor, a graphic processing unit, or other accelerators where the registers have larger data width. For example, not stalling the loop operation and the ability to send large numbers of external memory requests in vector processor provide improved performance.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention.

Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

What is claimed is:

1. A processor comprising:
   a loop detection unit
      that receives instructions;
      identifies a loop in a sequence of instructions;
      determines if the loop is of a first type in which instructions can be executed out-of-order and determines if the loop is of a second type in which instructions cannot be executed out-of-order; and
      if the loop is of the first type, divides the loop into a first loop and a second loop, wherein second result data from execution of the second loop can be provided before first result data from execution of the first loop;
   an instruction issue unit, coupled to the loop detection unit, for receiving instructions of the first loop, and issuing a first instruction from a first iteration of the first loop, and issuing a second instruction from a second iteration of the first loop; and
   an execution queue coupled to the instruction issue unit to receive the first instruction and the second instruction from the instruction issue unit, the execution queue dispatching the first instruction and the second instruction to a first functional unit;
   wherein the second result data returns from the first functional unit out-of-order with respect to the first result data.

2. The processor of claim 1 further comprising:
   a branch prediction unit that receives instructions and predicts that the loop can be executed out of order.

3. The processor of claim 1 further comprising:
   a control register and a status register that operate to disable or enable the type of loop detected in the loop detection unit.

4. The processor of claim 1 wherein execution of the second loop is stalled in the instruction issue unit waiting for first result data from the first functional unit before dispatching the instruction to a second functional unit.

5. The processor of claim 1 wherein the instruction issue unit receives an instruction of the second loop and issues the instruction of the second loop to a second execution queue, wherein the second execution queue dispatches the instruction of the second loop to a second functional unit when first result data is received from the first functional unit.

6. The processor of claim 1 wherein first and second instructions of the first loop are load instructions and wherein the instruction of the second loop is data processing instruction wherein the data processing instruction can be integer or floating-point or vector instructions.

7. The processor of claim 6 wherein a physical memory attribute register or a physical memory protection register disable or enable a type of loop to be included in the loop detection unit based on the load address calculated from an instruction of the first loop.

8. A processor as in claim 5 further comprising:
   a clock circuit;
   a time counter coupled to the clock circuit and storing a time count representing a current time of the processor, wherein the time count is incremented periodically;
   wherein the preset execution time is correlated to the time count based upon the clock cycle, the time counter comprises an N-bit counter wherein an Nth-bit count value represents a largest future time for the instruction issue unit to issue an instruction; and
   wherein the N-bit counter returns to a zero count after reaching the Nth-bit value.

9. The processor of claim 8 further comprising:
   a plurality of resources reserved to execute instructions of the first and second loops wherein the plurality of resources include at least one of: a plurality of read buses, a plurality of write buses, and a plurality of functional units wherein each resource further comprising of the latest busy time.

10. The processor of claim 9 further comprising:
    an instruction decode unit coupled to the plurality of reserved resources which are selected by the loop detection units for an out-of-order loop and coupled to the register scoreboard in which the instruction decode unit reads write times for source operands of an instruction from the register scoreboard, and use the latest busy times of the reserved resource or the write times to determine an execution time for the instruction.

11. The processor of claim 10 further comprising:
    a time-resource matrix unit coupled to the register scoreboard and the time counter for storing information relating to available resources for each time count of the N-bit time counter;
    wherein the available resources include at least one of: a plurality of read buses, a plurality of write buses, and a plurality of functional units;
    wherein the time-resource matrix unit adjusts the number of available resources due to the reserved resources used by the active out-of-order loop operation; and
    wherein the instruction issue unit is coupled to the time resource matrix unit to receive data therefrom to issue an instruction if all the resources from the time-resource matrix are available, and to stall the instruction if any of the resources is not available.

12. The processor of claim 10 wherein the instruction issue unit receives a third instruction after the out-of-order loop and issues the third instruction.

13. The processor of claim 10 further comprising:
    a read control unit reading a register of a register file or a forwarding functional unit with time count entries and for each register entry therein forwarding a valid bit to indicate when the corresponding register entry may be read and transported on a read bus or the corresponding result data of the functional unit may be forwarded and transported on a read bus; and wherein the read control unit further comprises a loop bit to indicate the beginning of the out-of-order loop operation and the read bus is reserved for data forwarding between the functional units.

14. The processor of claim 13 further comprising:
a write control unit storing a register of a register file with time count entries to indicate when result data are transported from a write bus and written to a register of the register file;
wherein the write control unit further comprises a loop bit to indicate the beginning of the out-of-order loop operation and the write bus is reserved for writing back data from a functional unit to the register file wherein further comprising writing back data from a functional unit to the register file only on the last iteration of the out-of-order loop.

15. The processor of claim 14 wherein the execution queue stores a plurality of instructions wherein each instruction includes a read time which is a future time based on the time count and a loop count which may include the loop count for a OOO loop wherein the instruction is continuously dispatched to the functional unit every clock cycle and the loop count is decremented until the loop count is reset.

16. The processor of claim 15 wherein the read bus control is synchronized with the read time in the execution queue.

17. A processor comprising:
a clock circuit;
a time counter storing a time count representing a current time of the processor, wherein the time count is incremented with each cycle of the clock circuit;
a register file including a plurality of registers;
a loop detection unit for receiving instructions from a loop and determining if the iterations of the loop can be executed out-of-order and breaking the loop into a first loop and a second loop wherein the out-of-order loop is defined as a second result data of the first loop are received and executed by the second loop before a first result data of the first loop;
an instruction issue unit coupled to the loop detection unit for receiving instructions from the first loop, and issuing a first and a second instructions from a first and a second iteration of the first loop;
an execution queue coupled to the instruction issue unit to receive the first and the second instructions from the instruction issue unit, and dispatch the first and second instructions to a first functional unit wherein the result data of the second instruction may return out-of-order with respect to first instruction and the first functional unit sends result data out-of-order to an instruction of the second loop;
a register scoreboard storing a write time and a loop bit of a register in a register file, wherein the write time is a future time based on the time count and wherein the loop bit indicates the register is part of the out-of-order loop operation;
an instruction decode unit coupled to the register scoreboard, wherein the instruction decode unit reads write times for source operands of an instruction from the register scoreboard, and uses the write times to determine an execution time for the instruction;
a time-resource matrix coupled to the register scoreboard and the time counter for storing information relating to available resources for each time count of the time counter and wherein the available resources are adjusted for resources used by the out-of-order loop operation; and
wherein the available resources include at least one of: a plurality of read buses, a plurality of write buses, and a plurality of functional units.

18. A computer program product for implementing a microprocessor, the computer program product stored on a non-transitory computer readable storage medium and including instructions for causing a computer system to execute a method that is executable by a processor, the method comprising:
detecting a loop for out-of-order execution of the iteration of the loop;
breaking the loop into a first loop and a second loop wherein the out-of-order loop is defined as a second result data of the first loop can be received and executed by the second loop before a first result data of the first loop;
reserving resources for out-of-order loop execution, the resources comprising a plurality of read buses, a plurality of write buses, and a plurality of functional units;
issuing instructions of a first and second instruction of the first loop to an execution queue in a processor to execute wherein the result data of the second instruction may be valid and forwarded to another functional unit of the second loop for execution before the result data of the first instruction.

19. The computer program product of claim 18 wherein the method comprises:
executing instructions of the out-of-order loop at future times wherein future times are based on a time count from a time counter; and
periodically incrementing the time counter which provides a maximum time count corresponding to the latest future time to issue an instruction.

20. The computer program product of claim 19 wherein the method further comprises:
storing a write time and a loop bit of a register of a register file wherein the write time is a future time based on the time count and wherein the loop bit indicates the register is part of the out-of-order loop.

21. The computer program product of claim 20 wherein the method further comprises:
storing information corresponding to available resources for each time count in a time-resource matrix, wherein the resources comprise at least one of a plurality of read buses, a plurality of write buses, and a plurality of functional units; and
adjusting the number of available resources by the resources used by an active out-of-order loop operation.

22. The computer program product of claim 21 wherein the method further comprises:
storing a register of a register file and a loop bit in a read bus control, wherein the register is read from the register file and transported on a read bus, wherein the loop bit reserves the read bus for the out-of-order loop operation until completion of the out-or-order loop operation.

23. The computer program product of claim 22 wherein the method further comprises:
storing a register of a register file and a loop bit in a write bus control;
transporting result data from a write bus and writing to the register of the register file;

wherein the loop bit reserves the write bus for writing back result data of the out-of-order loop operation; and writing back result data of the out-of-order loop operation only on the last iteration.

24. The computer program product of claim 19 wherein the method further comprises:

storing a plurality of instructions in an execution queue wherein each instruction includes a read time based on the time count and a loop count;

dispatching the instruction to a functional unit every clock cycle and decrementing the loop count until the loop count is reset.

25. The computer program product of claim 24 wherein the method further comprises:

configuring the execution queue to dispatch instructions to a single functional unit or to multiple functional units.

26. The computer program product of claim 22 wherein the method further comprises:

synchronizing the read time of the execution queue with the read bus control.

27. The computer program product of claim 24 wherein the method further comprises:

synchronizing the read time of the execution queue with the read bus control.

28. The computer program product of claim 18, wherein the method further comprises:

storing of an out-of-order loop prediction in a branch prediction unit.

* * * * *